UNITED STATES PATENT OFFICE.

LEON PILASKI, OF WARSAW, RUSSIA.

PROCESS OF MAKING ACTIVE CHARCOAL POWDER.

1,195,720.      Specification of Letters Patent.      Patented Aug. 22, 1916.

No Drawing.      Application filed August 7, 1913. Serial No. 783,547.

*To all whom it may concern:*

Be it known that I, LEON PILASKI, a subject of the Czar of Russia, and residing at Warsaw, Poland, Russia, have invented a certain new and useful Improved Process of Making Active Charcoal Powder, of which the following is a specification.

My invention relates to a process of making active charcoal powder for cleaning and filtering purposes.

Active charcoal powder which has of late been employed for cleaning and filtering purposes as a substitute for the expensive bone charcoal is usually made, in accordance with known processes, from lignite, brown coal, peat or certain animal or vegetable refuse. It is not, however, always economical to employ these raw materials because in many districts neither lignite, brown coal, peat nor the particular refuse required is readily obtainable, and must consequently be conveyed from very remote districts. For this reason, the cost of production is increased, and it is no longer economical to employ charcoal powder for the above-described purpose.

A primary object of my invention is to provide a very inexpensive method of making active charcoal powder, a raw material being employed which at the present time is of no appreciable value and is, moreover, obtainable everywhere. To this end, I employ house refuse and street sweepings for making the charcoal powder. An additional advantage I obtain is that the hygienic conditions of the town are improved, for, as is well known, house refuse and street sweepings are frequently dumped into heaps outside the town and there allowed to putrefy.

An analysis of the house refuse and street sweepings of Warsaw has shown that these contain 40-50% of fine refuse which will pass through a sieve having 3 mm. apertures, 30-40% coarser refuse which will pass through a sieve having 15 mm. apertures, and a remnant of 15-25% which will not pass through the latter sieve, and which comprises: 10-15% coal, rags, bones, animal and vegetable refuse, paper, leather, wood, straw, and the like, and 5-10% stone, slag, porcelain, glass and metal.

The fine refuse constituting about 50% of the whole of the refuse consists principally of ashes and forms a very valuable product for farmers, who purchase the same. For making the active charcoal powder I employ the coarser refuse which constitutes half the entire quantity. After the starting refuse has been sifted through a sieve having 3 mm. apertures for separating the particles employed for agricultural purposes, the remnant is freed, either by hand or mechanically, from the practically valueless constitutents, as *e. g.* slag, porcelain, stone and the like. Thereupon the very coarse refuse is exposed for a time to the action of chemical agents, as *e. g.* burnt lime or its equivalent. The mixture thus obtained is then subjected to dry distillation preferably at a red heat and the coke thus obtained is ground to dust. In one case, when refuse which had been subjected to the above-mentioned sorting was exposed to the action of calcium oxid, namely, burnt lime, 5 parts by weight of lime were added to 100 parts by weight of refuse, the action of the lime on the refuse, with simultaneous access of air, lasting for about 5 to 7 days. The mixture was then subjected to dry distillation at 600° to 700° C. for a period of 40-45 minutes. The products obtained in addition to coke consisted of tar and ammonia.

The complete process can be briefly described as follows: The refuse is dried, and is run through a sieve having three millimeter openings. In this manner the finer refuse is separated and used for agricultural purposes. The rest of the refuse is run through a sieve having fifteen millimeter openings. In this manner the coarse refuse is separated, which is the chief constituent of the raw material to be operated upon. The remainder in the sieve is now sorted out. Paper, leather, stone, porcelain, glass, metal, are laid aside, and used for industrial purposes. The rest, which consists of the various kinds of refuse set forth, is now joined to the coarse refuse. The raw material so secured has now about five per cent. by weight of calcium oxid added thereto. After the mixture has been fluxed by the working of the lime, it is dry distilled at a temperature of from 700-800° C (red glow) in the retort. In this manner an active carbon is obtained in the retort that is cooled, while excluding the air, and then ground to powder.

The active charcoal powder, which was prepared in the manner described but which, as stated, can also be prepared by adding other chemical agents, possesses in a high degree the capacity of cleaning liquids, when the latter are thoroughly mixed with it, and of filtering liquids. This charcoal powder removes the colloidal substances from colloidal solutions, while it absorbs the organic substances, especially those capable of putrefaction. This action can be still further enhanced and accelerated, according to circumstances, by employing chemical precipitants, such as sulfate of aluminium or of iron.

My above-described process can be carried out both cheaply and economically because it is necessary to employ neither lignite, brown coal, peat nor other special, not universally obtainable, starting material. The cost of carriage of house refuse and street sweepings to the place of employment, as also the requisite cost of sifting are, in fact, partly covered by the proceeds of the sale both of the 50% fine refuse for agricultural purposes, and of the rags, glass, metal and the like which are separated from the other refuse.

I claim:

1. A process for making active charcoal powder for the purposes of cleansing and filtering, which consists in treating house and street refuse with lime for a considerable period, subjecting the mixture to dry distillation, and grinding the resulting product to charcoal powder.

2. A process for making active charcoal powder, which consists in separating from house refuse and street refuse the fine and siliciferous constituents that will pass through a sieve having substantially three millimeter apertures, separating from the coarser residue the valueless constituents, treating the remainder with burnt lime for a considerable period, and then subjecting it to dry distillation and then grinding the product to powder, substantially as described.

3. In the art of making active charcoal powder from house and kitchen refuse, those steps in the art which consist in treating said refuse with lime for a considerable period, before distillation thereof, and then distilling it.

4. In the art of making active charcoal powder from house and street refuse, those steps in the art which consist in treating the coarser and productive parts with lime for a considerable period, while permitting the access of air, and then distilling said refuse after the lime has acted thereon.

In testimony, that I claim the foregoing as my invention, I have signed my name in presence of two subscribing witnesses.

LEON PILASKI.

Witnesses:
 WOLDEMAR HAUPT,
 HENRY HASPER.